(12) United States Patent
Clifford-Brown (10) Patent No.: US 11,963,591 B2
(45) Date of Patent: Apr. 23, 2024

(54) HANDLES FOR POLES AND STICKS (71) Applicant: Rupert Clifford-Brown, Birmingham (GB)

(72) Inventor: Rupert Clifford-Brown, Birmingham (GB)

( * ) Notice: Subject to any disclaimer, the term of this patent is extended or adjusted under 35 U.S.C. 154(b) by 390 days.

(21) Appl. No.: 17/280,463

(22) PCT Filed: Sep. 27, 2019

(86) PCT No.: PCT/GB2019/052739
§ 371 (c)(1),
(2) Date: Mar. 26, 2021

(87) PCT Pub. No.: WO2020/065342
PCT Pub. Date: Apr. 2, 2020

(65) Prior Publication Data
US 2021/0345739 A1 Nov. 11, 2021

(30) Foreign Application Priority Data
Sep. 28, 2018 (GB) ..................................... 1815878

(51) Int. Cl.
*A45B 3/04* (2006.01)
*A45B 9/02* (2006.01)
(Continued)

(52) U.S. Cl.
CPC .................. *A45B 3/04* (2013.01); *A45B 9/02* (2013.01); *A63C 11/222* (2013.01); *H02J 7/0044* (2013.01); *H02J 7/0045* (2013.01); *A63C 11/227* (2013.01); *A63C 11/228* (2013.01); *A63C 2203/12* (2013.01); *A63C 2203/24* (2013.01)

(58) Field of Classification Search
CPC .......... H02J 7/0044; H02J 7/0045; A45B 3/04
See application file for complete search history.

(56) References Cited

U.S. PATENT DOCUMENTS 572,244 A 12/1896 Hae et al.
5,271,640 A * 12/1993 Potochick .............. A63C 11/22
362/102
(Continued)

FOREIGN PATENT DOCUMENTS

CN 207118685 U 3/2018
CN 207666133 U 7/2018
(Continued)

OTHER PUBLICATIONS

International Search Report and Written Opinion for Application No. PCT/GB2019/052739 dated Mar. 12, 2019 (10 pages).
(Continued)

*Primary Examiner* — Noah Chandler Hawk
(74) *Attorney, Agent, or Firm* — Michael Best & Friedrich LLP (57) ABSTRACT

A handle 10 for a pole that houses within its body 12 a power means housing 20, the housing 20 having an electrical power storage means 50 where a device can be connected to the handle 10 and supplied with electrical energy from the storage means 50. Due to increased demands of portable electricity, during outdoor activities, the handle 10 allows a means to easily carry and supply electricity for devices.

20 Claims, 8 Drawing Sheets

(51) Int. Cl.
*A63C 11/22* (2006.01)
*H02J 7/00* (2006.01)

(56) References Cited

U.S. PATENT DOCUMENTS

| | | | | |
|---|---|---|---|---|
| 9,618,624 | B2* | 4/2017 | Krauss | G01S 19/19 |
| 9,989,242 | B1* | 6/2018 | Pradas | G02B 6/001 |
| 10,779,620 | B1* | 9/2020 | Johnson | F21L 4/08 |
| 11,363,862 | B2* | 6/2022 | Cheng | A63C 11/225 |
| 2005/0014607 | A1* | 1/2005 | Olkkonen | A63B 69/0028 |
| | | | | 482/8 |
| 2009/0242539 | A1* | 10/2009 | Wassel | A63C 11/228 |
| | | | | 219/211 |
| 2010/0043853 | A1* | 2/2010 | Wu | A45B 3/04 |
| | | | | 135/66 |
| 2010/0067222 | A1* | 3/2010 | Yu | A45B 3/04 |
| | | | | 362/190 |
| 2012/0061371 | A1* | 3/2012 | Broom | A63C 11/222 |
| | | | | 280/821 |
| 2013/0247945 | A1 | 9/2013 | Krauss | |

FOREIGN PATENT DOCUMENTS

| | | | | |
|---|---|---|---|---|
| DE | 10337348 | A1 | 3/2005 | |
| DE | 202018103122 | U1 | 6/2018 | |
| GB | 2429273 | A | 2/2007 | |
| GB | 2589319 | A * | 6/2021 | A45B 3/00 |
| JP | S54131437 | A | 10/1979 | |
| JP | H05137827 | A | 6/1993 | |
| JP | 2004520925 | A | 7/2004 | |
| JP | 2004290442 | A | 10/2004 | |
| JP | 2005198499 | A | 7/2005 | |
| JP | 3120871 | U | 4/2006 | |
| JP | 2018139467 | A | 9/2018 | |
| KR | 200413382 | Y1 | 4/2006 | |
| KR | 20160139683 | A | 12/2016 | |
| TW | M531770 | U | 11/2016 | |
| WO | WO-2013083884 | A1 * | 6/2013 | A45B 3/00 |

OTHER PUBLICATIONS

International Preliminary Report on Patentability for Application No. PCT/GB2019/052739 dated Apr. 8, 2021 (8 pages).
Translation of Taiwanese Patent Office Action for Application No. 108135477 dated for Aug. 10, 2023 (10 pages).
United Kingdom Patent Office Action for Application No. GB1815878.2 dated for Mar. 13, 2019 (7 pages).
Translation of Japanese Patent Office Action for Application No. 2021-517648 dated for Aug. 28, 2023 (4 pages).
Chinese Patent Office Action for Application No. 2019800784823 dated for Sep. 20, 2023 (10 pages with English translation).

* cited by examiner

HANDLES FOR POLES AND STICKS

CROSS REFERENCE TO RELATED APPLICATIONS

This application is a U.S. National Phase application of International Patent Application No. PCT/GB2019/052739 filed Sep. 27, 2019 which claims priority to G.B. Patent Application GB 1815878.2 filed Sep. 28, 2018, the entire contents of both of which are herein incorporated by reference.

BACKGROUND

The invention relates to a handle for a pole or stick used in outdoor activities and more specifically to handles for ski poles or walking poles.

When performing some, often outdoor, activities, poles can be used for balance and stability. Such examples include skiing where poles can be used to assist with turning or used to propel the user forward. Other activities, such as Nordic walking, use poles for balance and to encourage upper body movement. In these examples, two poles are often used and this impacts the user's encumbrance due to a lack of a free hand for carrying items, etc.

Furthermore, there is an increasing demand for electrical energy to ensure various devices can be powered through extended use. Mobile phones are commonly carried. However, further electric energy consuming devices are often used, such as navigation devices, handheld gaming consoles, smart watches, etc. Likewise, there is also a demand to track various activities on a mobile phone, such as metrics for physical activities.

It is known that external power packs can be used to store and provide electrical energy when on the move. The capacity of power packs is ever increasing to keep up with power demands. These power packs come in various shapes and are generally kept in a pocket or in a bag where a device can be connected to it when electric energy is required.

When performing activities such as the ones discussed above, it is often difficult to access pockets or bags due to poles being carried or gloves being used at the same time. However, it is during these activities that power can often be required due to being in remote locations and requiring navigation devices or the like. Likewise, the checking of a mobile phone to view metrics or information can also be difficult. Conversely, the carrying of power packs or additional mobile devices can also be undesirable due to the added weight of bags they are housed in, or the general desire not to have items in pockets that could cause physical harm during a fall.

SUMMARY OF THE INVENTION

Therefore, there exists a need to be able to provide a means of power and information to those undertaking activities such as skiing and Nordic walking where there may be a lack of free hands.

In accordance with an aspect of an invention there is provided a handle for a pole wherein the handle comprises: a handle body, the handle body having an enclosure aperture; a power means housing comprising: an elongate portion having a first end and a second end and being removably located within the body through the enclosure aperture; and an interface portion having a lower surface and an upper surface and being removably connected at its lower surface to the second end of the elongate portion and having an access aperture in the second surface, wherein the elongate portion has a battery aperture at the second end to allow the insertion of an electrical power storage means therein and wherein a device is connectable to the electrical power means through the access aperture. This allows access to electrical power contained within the handle and allows the removal of the elongate and interface portions to allow recharging or to relocate the electrical supply of the power means housing elsewhere whilst leaving a handle body intact.

In accordance with a further aspect of the invention, there is provided a handle for a pole, in accordance with claim 1, wherein the handle comprises: a handle body having an internal cavity; a battery housing, wherein at least part of the battery housing is located within the internal cavity through an enclosure aperture; an interface portion positioned at an end of the battery housing; a communication means for transferring data wirelessly between a mobile computing device; a display means positioned on the battery housing and configured to display information provided through the communication means; wherein the battery housing has an electrical power storage means therein and wherein an electronic device is connectable to the electrical power storage means through the interface portion for transferring electrical power between the electrical power storage means and a connected electronic device. This allows access to electrical power contained within the handle and allows the removal of the battery housing to allow recharging or to relocate the electrical supply of the power means housing elsewhere whilst leaving a handle body intact. This also allows various details to be displayed on the display of the device, or the transfer of data to and from the device.

Preferably the battery housing comprises a head portion and an elongate portion, and wherein the enclosure aperture is sealed by the head portion of the battery housing. This ensures that the internal cavity is sealed from the ingress of water.

Preferably at least part of the head portion is wider than the enclosure aperture to sealingly close the enclosure aperture. This ensures that a wider head or portion of a head sits around the rim of the enclosure aperture to perform a seal or labyrinth style seal to make ingress of water or contaminants more difficult.

Preferably the head portion protrudes from the external cavity. This allows a sealing portion and also an interactive portion so that access to the electronic functions of the device is provided.

Preferably the head portion is detachable from the elongate portion. This allows for easier manufacture as different materials and manufacturing techniques can be used for each part. For instance, the head portion might be plastic, whereas the elongate portion can be metal such as aluminium. This can also provide access to ports in the elongate portion of the device. It can also be useful for maintenance where only part of the battery housing has malfunctioned and thus only part of it needs to be replaced. In some embodiments the head portion and elongate portion are formed as one part. The head portion can be formed as a sealed unit, e.g. one piece construction. The elongate portion can likewise be formed in such a manner. These two parts can be sealed together or formed as one part.

Preferably the interface portion is contained within the battery housing and accessible through an access aperture in the battery housing. The interface portion can be various plugs, such as USB, and can sit within the battery housing and be in contact with the power storage. A cable can be plugged into the interface portion through an aperture in the battery housing. In some embodiments, the handle body can also have an aperture to access the interface portion. Whilst discussion reference is made to USB ports, wireless charging of the power storage can also be utilised.

Preferably the battery housing comprises a battery aperture to allow the insertion of the electrical power storage means. This allows an electrical power storage means, e.g. a battery, to be inserted into the battery housing. The power storage means could be removable so that it is swappable or chargeable elsewhere, or it may be non-removable to allow for custom power storage specifications for a more compact device.

Preferably the battery aperture is located at the same end of the battery housing as the interface portion. This allows a single sealing point for both the battery insertion and the interface portion to prevent ingress of various materials. It can also simplify manufacturing by having the battery aperture being a cap that contains the interface portion.

Preferably at least part of the battery housing is removably located within the internal cavity. This allows the battery housing to be removable from the handle body to charge it or use it as a battery elsewhere. It also ensures that a walking stick or pole does not need to be carried into a house, etc. for charging or the device or pairing with a mobile device. This also allows the battery to be portable, so that it does not need to be left on a ski pole which is often left outside a café on a ski slope, for instance.

Preferably a release mechanism is provided on the handle body for allowing the battery housing to be released from the location in the handle body. This ensures that the battery housing is held in the handle body until a user requires that it is removed. Therefore, accidental release of the battery housing is prevented.

Preferably the release mechanism comprises a lever pivotly connected to the handle body and moveable from a first position to a second position, wherein in the first position a portion of the lever is in contact with the battery housing constraining movement of the battery housing and in the second position the lever is positioned away from the battery housing. The pivot function allows a mechanism for releasing the battery housing when required. The lever can be flush with the handle body. The lever can be biased to the first position to ensure that the battery housing is always held in position until a force is applied. The force required will be such that accidental pressing is prohibited.

Preferably the release mechanism constrains the battery housing by a protrusion and notch arrangement on the battery housing and release mechanism. The notch and protrusion can be either way around. For instance, the notch can be contained on an outer surface of the battery housing and the protrusion on the lever. This also provides feedback when the battery housing is positioned in the handle body due to the lever being positioned in a locked position, or a 'click'.

Preferably the interface portion is wholly contained within the handle body when the battery housing is located within the internal cavity. This can prevent ingress of water or other materials into the interface portion. The battery aperture can likewise or instead be located at this position. Therefore, any materials, such as water, would need to pass around a head portion of the handle, down through the internal cavity and then to the interface or battery aperture before reaching the internals of the device. This provides a better sealing solution.

Preferably the interface portion is sealingly closed by the internal cavity. This allows the interface portion to seal against an inside of the internal cavity, e.g. by interaction with a seal or an inside of the internal cavity. This can further seal the internals of the device.

Preferably the interface portion is located at a base of the internal cavity at the end opposite the enclosure aperture. This provides the maximum distance from any opening this increasing sealing properties.

Preferably a control means is provided for controlling the communication means and the display means. This control means can be a processor and memory for controlling a device. It can be formed on a circuit board or printed circuit board (PCB) or on a System on a Chip (SOC). This provides control of the display, light or LED, the data connection, the power, any buttons or interactions and other components of the device.

Preferably a lighting means to indicate an internal status of the handle is provided. This can show various details such as battery level, whether the battery housing is located in the handle body, whether there is a data or power connection with a device, whether certain functions are enabled, such as GPS.

Preferably the handle comprises a transparent screen provided on the display. This can provide protection for the display which is contained within the battery housing. As the handle can be dropped, a recessed or protected screen is preferred to avoid damage. The screen or display can also have coatings, such as anti-glare, to ensure that the screen is readable.

Preferably the handle comprises a touch sensor for interacting with the display and/or handle. A touch sensor can include a touch display or a button for changing the information on the display on the device or causing other functions of the handle, such as power delivery.

Preferably there is provided a power port within the access aperture connected to the electrical power means configured for connection of a device for the supply of electrical energy from the electrical power means to the device. This allows the connection of a power consuming device, such as a satellite navigation, to charge from the battery within the handle or power means housing through the power port that might be a USB port. The power port can also be a connection port for the transfer of data.

More preferably the power port allows the supply of electrical energy from a device to the electrical power means. This allows the recharging of a battery within the handle. More preferably still, multiple power ports are provided within the aperture where each port can supply power from a device, supply power to a device, or both.

Preferably there is provided a side aperture in the interface portion positioned on a wall between the first surface and the second surface, the side aperture providing access to a power button for operating the supply of electrical energy from the electrical power means. This allows the operation of the power supply as required so it can be switched on or off as required.

More preferably the power button provides an indication of the electrical energy level within the electrical power means. This will allow the easy way of recognising that the energy level is high or low and the battery needs changing or recharging.

Preferably the power button comprises an LED wherein the LED is operable to indicate the status of the supply operation or electrical energy level. This allows the easy indication of whether the supply is active or the level of energy. A number of ways can be achieved through a light, for instance by a particular colour of light giving a different indication (e.g. green for full/on), or by the intensity of a light, or by the operation of a light to indicate it is supplying energy or above a threshold energy level (e.g. light illuminates over 20% battery), or by the flashing of a light (e.g. a scale of 1 to 5 of battery level). Preferably an array of lights can be provided for providing indications.

Preferably the power button and power port are provided on a power board that provides a connection from the electrical power storage means. More preferably the power board provides the transfer of electrical energy connection between the electrical power storage means and the power port and the power board allows the control the transfer of electric energy by the power button. This power board allows the electricity to get from the battery to the USB port, or similar and can be a circuit board and can have a controller module such as a system on a chip (SoC) or other processor. This also provides an interface for the control via the power button and allows the status monitoring.

Preferably there is provided an actuation means for operating the power button, the actuation means extending through and filling the side aperture. This eases the actuation of the power button from the outside of the interface portion. It also prevents the ingress of materials into the inside of the interface portion.

Preferably there is provided a resilient means for reverting the actuation means back to an original position after actuation. This allows the actuation means to be reset after pressing the power button.

Preferably the actuation means is made of translucent or transparent material. This allows the LED to be seen if it is present.

Preferably the handle body comprises connecting means to allow connection of the handle to a pole at the end of the handle body opposing the enclosure aperture. This allows the handle to be connected to a pole when required.

Preferably there is provided a sealing plug that is removably insertable within the access aperture. This ensures that the access aperture can be closed when access to an electrical supply is not required to prevent damage to the power ports.

Preferably the sealing plug comprises a closing portion that sealing closes the access aperture. This ensures a seal from the ingress of materials, such as liquids, within the ports.

Preferably the closing portion is an extended portion with a recessed groove that affixes within a lip of the access aperture. Such a lip and groove configuration provides a labyrinth type seal for further providing a difficult course for liquids or materials to pass therethrough.

Preferably the sealing plug is flexibly attached to the interface portion. This ensures that the plug is not lost when it is not in a closed position.

More preferably there is a provided an outer groove on an outer wall of the interface portion, wherein the flexible attachment of the sealing plug is via the outer groove.

More preferably still, there is provided an O-ring that is rotatably positioned within the outer groove and the sealing plug is tethered to the O-ring through a flexible attachment member. This allows the sealing plug to rotate about the interface portion but to still be flexibly attached.

Preferably there are provided axially extending fingers that extend from the second end of the elongate portion and are for releasably connecting the elongate portion to the interface portion. This provides a connection means for keeping the power means housing parts as one piece when required.

Preferably the extending fingers comprise holding grooves for retaining the power board on the second end of the elongate portion. This ensures that the power board or circuit board is held in position and as such the power button is aligned to the side aperture and the power port is aligned to the access aperture.

In a further aspect there is provided a ski pole comprising the handle as described above.

In a further aspect there is provided a walking stick comprising the handle as described above.

There is also provided a secondary or dummy handle which looks the same as the handle hereinbefore described. However, the secondary handle does not include any of the internals of the battery housing. Therefore, the secondary or dummy battery housing is a solid formed piece that has the same weight as the battery housing with the electrical storage means and display and other components. More preferably the secondary handle body and battery housing are formed as one piece having the same weight as the handle. This allows a second pole to be provided that has the same look and weight characteristics as the first pole. However, it does not include the internal features and is thus cheaper to produce yet still forms a pair for multiple pole activities.

BRIEF DESCRIPTION OF THE DRAWINGS

These and other features of the present invention will now be described in further detail, purely by way of example, with reference to the accompanying drawings, in which.

DETAILED DESCRIPTION

Figure 1A:
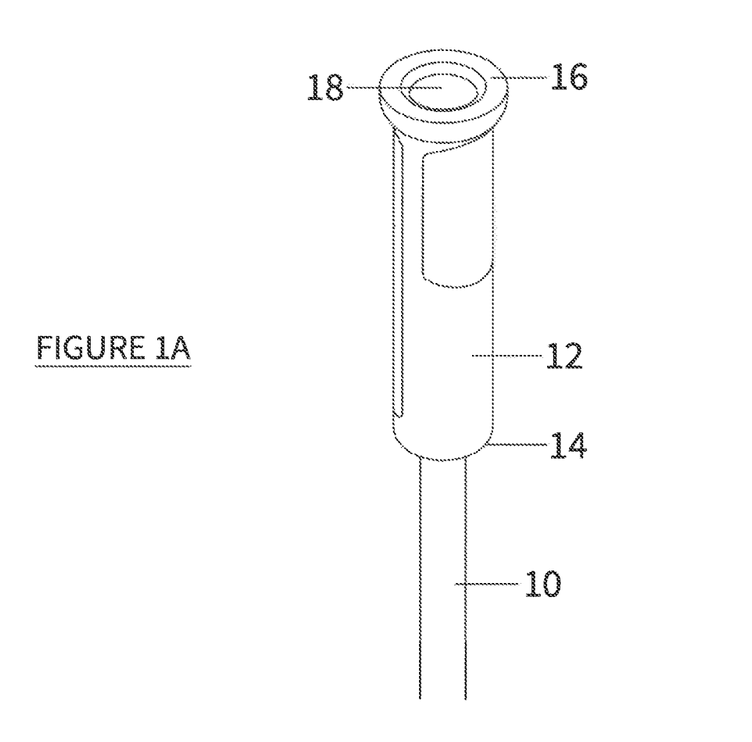
FIG. 1A is an isometric view of a handle body in accordance with an aspect of the invention.

First of all, referring to FIG. 1A there is provided a tubular pole 100 having a distal end (not visible in the figures) and a proximal end 102 at either end of the pole 100. The pole 100 is an elongate structure. The proximal end 102 extends into a handle 10 that is connected to the pole 100.

The handle 10 has a handle body 12 that is shaped for a user to be able to grasp or hold the handle 10 in a manner suitable for the purpose of the pole 100. The handle body 12 is predominately tubular and elongatedly extends from a pole end 14 to an enclosure end 16, wherein the pole end 14 of the body 12 is connected to the distal end 102 of the pole 100. The body 12 is generally wider, e.g. has a larger diameter, than the pole 100.

In some embodiments, finger notches or grooves can be provided on the handle body 12 to increase the ergonomic purpose of the handle 10, e.g. to allow for a user to grasp the handle 10 in a secure manner or a manner suitable for the activity being undertaken.

The pole 100 and handle 10 can be connected in various manners, such as the handle body 12 can have an opening on its first end to allow the pole 100 to be inserted therein. Alternatively, a flanged connection can be made between the pole 100 and the handle body 12. The pole 100 and handle body 12/handle 10 could even be formed as one single piece such as through extrusion or milling.

The enclosure end 16 of the handle body 12 transitions to a portion of the handle body 12 with a greater width and forms a lipped portion on the enclosure end 16 of the handle body 12. The transition portion is curved or otherwise chamfered to provide a smooth change/transition between the thinner and wider sections of the handle body 12. The enclosure end 16 has an opening i.e. an enclosure aperture 18 thereon that allows access to an interior portion 19 of the handle body 12. This is discussed in more detail later on.

Figure 1B:
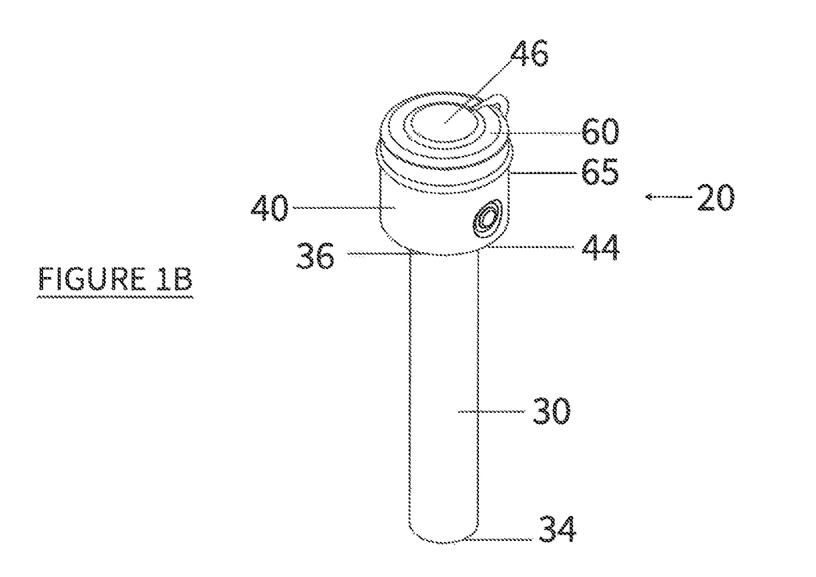
FIG. 1B is an isometric view of a power means housing in accordance with the invention.

There is also provided a power means housing 20 as shown in FIG. 1B. The power means housing 20 can also be called a battery housing 20. The power means housing 20 is an elongate portion 30 which is shaped as a cylindrical hollow tube. At each end of the elongate portion 30, i.e. at either end of the axis, is a first end 34 and a second end 36. The first end 34 of the elongate portion 30 extends linearly toward the second end 36. Along a portion of the length near to the second end 36, the elongate portion transitions to an interface portion 40 which has a larger circumference than the cylindrical shape of the elongate portion 30. The transition extends perpendicular to the axis of the tubular structures. The interface portion 40 then extends and terminates at an upper surface 36 thus forming an end of the power means housing 20.

The interface portion 40 of the power means housing 20 is sized such that it is the same or substantially the same width (or circumference) as the distal end enclosure end 16 of the handle body 12.

Whilst the shape of the interface portion 40 of the power means housing 20 and enclosure end 16 of the handle body 12 have been described as being cylindrical, they could be any shape that is appropriate. The two described parts could be such that they have the same plan when viewed from above to ensure that their sides sit flush with one another when juxtaposed.

As shown in FIG. 1A, the enclosure end 16 of the handle body 12 has an enclosure aperture 18 therein. The enclosure aperture 18 provides access to an interior portion 19. The interior portion 19 can extend through the length of the handle body 12 toward the pole end 14 of the handle body 12 (see FIG. 6). The enclosure aperture 18 of the handle body 12 has chamfered edges directed internally toward the interior portion 19.

Figure 2:
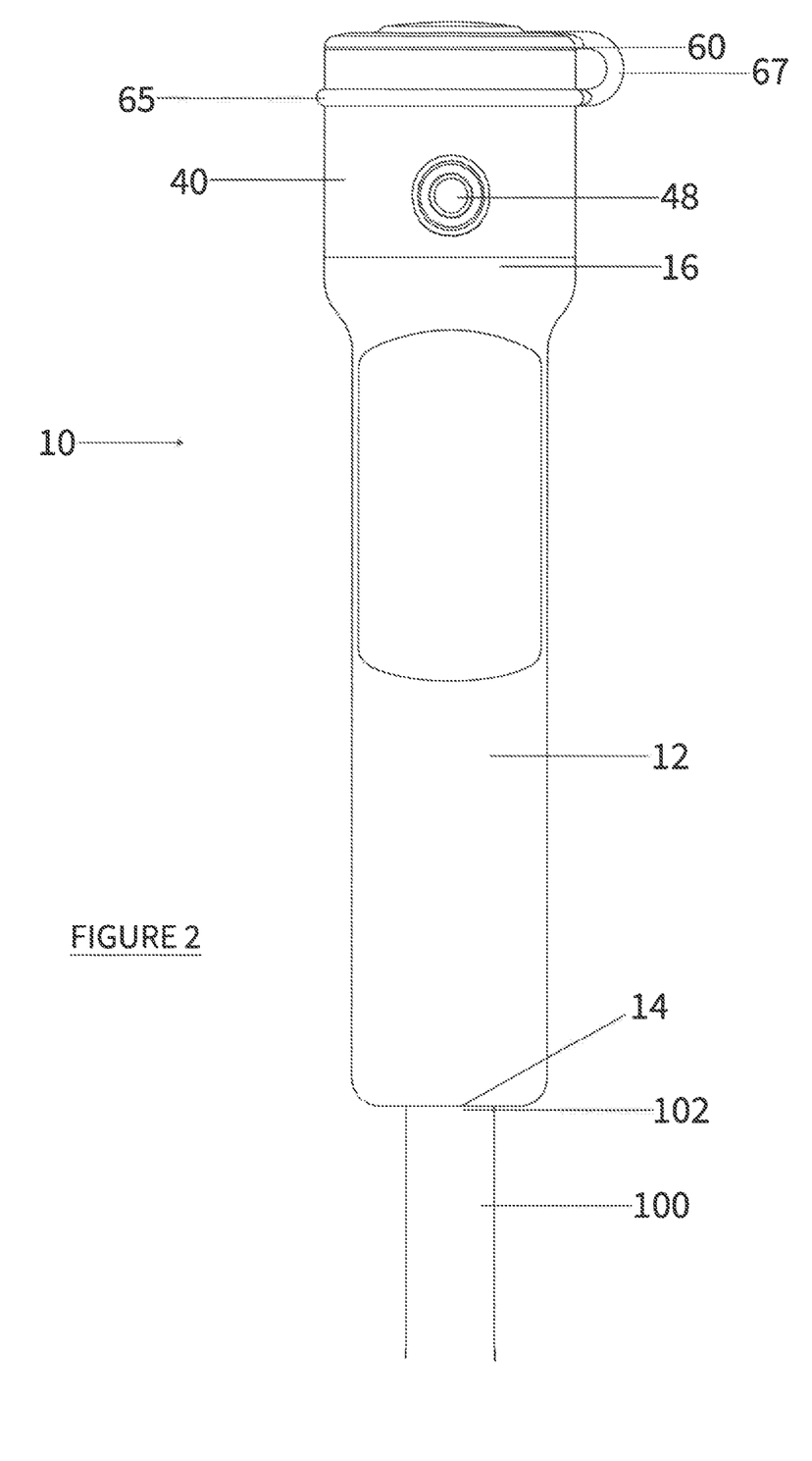
FIG. 2 is a side view of the handle body of FIG. 1A and the power means housing of FIG. 1B forming a handle in a combined configuration.

The interior portion 19 of the handle body 12 is shaped such that the elongate portion 30 of the power means housing 20 is insertable or otherwise placeable within the interior portion 19. FIG. 2 shows the power means housing 20 inserted into the handle body 12.

The interior portion 19 is shaped as an open cylinder, and sized similar to the tubular shape of the elongate portion 30 of the power means housing 20. When inserted, the enclosure end 16 of the handle body 12 and the lower surface 44 of the interface portion 40 of the power means housing 20 abut one another such that the elongate portion 30 of the power means housing 20 is restrained from passing further into the handle body 12. The lower surface 44 of the interface portion 40 and the enclosure end 16 of the handle body 12 are flush with one another.

Figure 6:
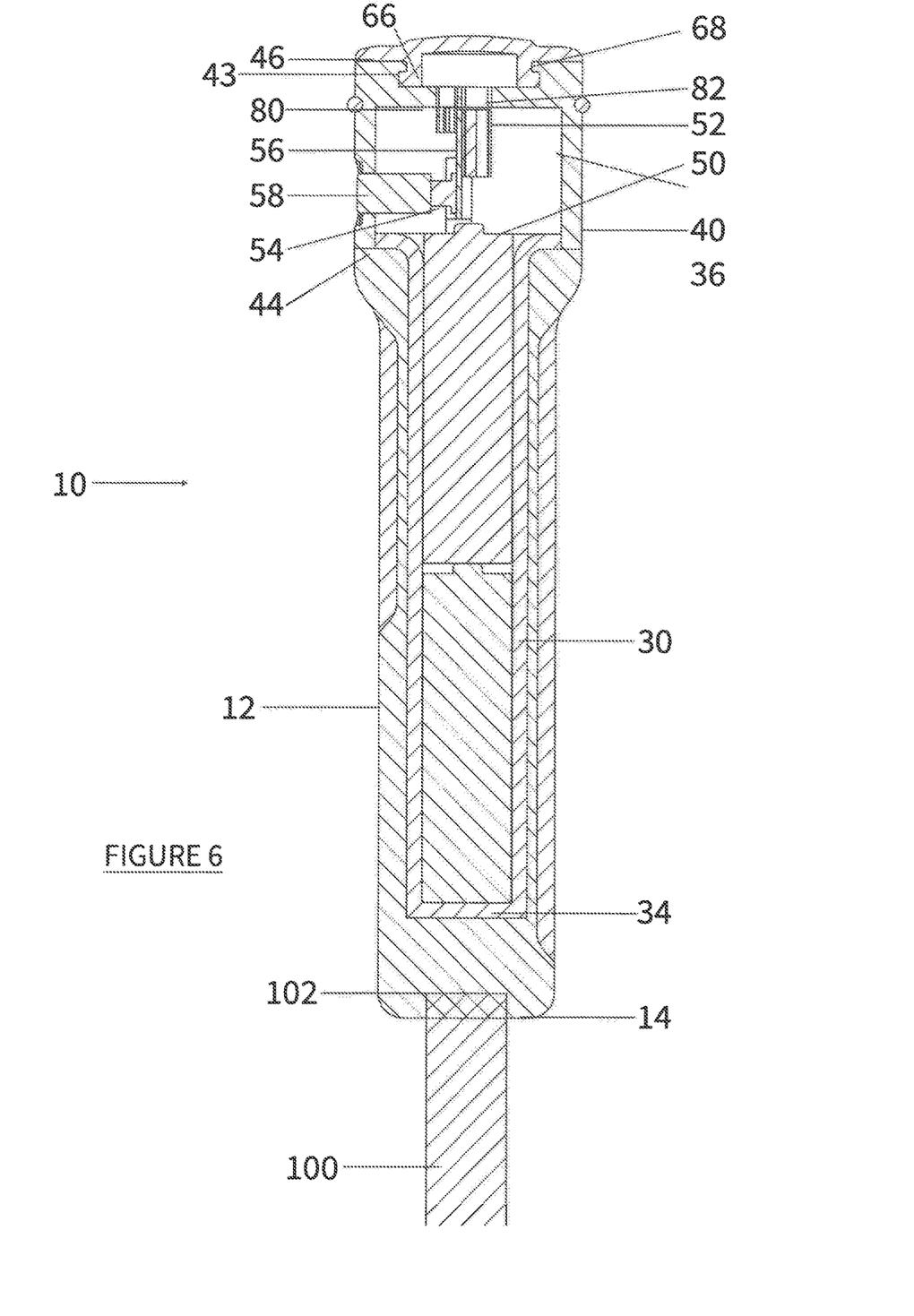
FIG. 6 is a side sectional view of the handle of FIG. 2.

As shown in FIG. 6, the first end 34 of the elongate portion 30 of the power means housing 12 may also abut with a bottom of the interior portion 19 of the handle body 12.

The handle body 12 and power means housing 20 may be removably connected by any means known in the art, such as a screw thread, groove, clip or otherwise.

Figure 3:
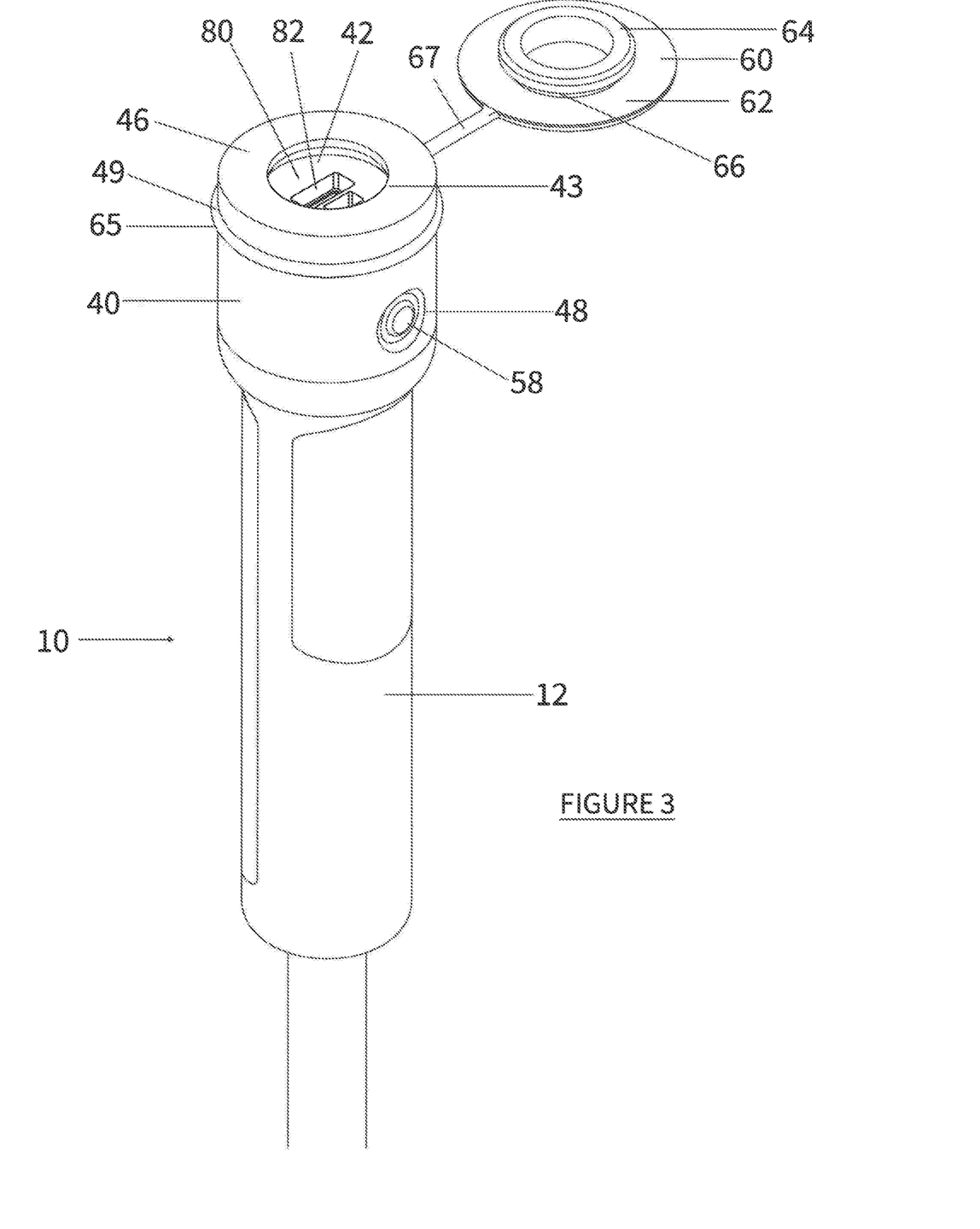
FIG. 3 is an isometric view of the handle in a combined configuration of FIG. 2 with a sealing plug in an open position.

Referring to FIG. 3, the cylindrical body of the interface portion 40 has an outer groove 49 about its circumference. The outer groove 49 is positioned toward the upper surface 46 of the interface portion 40. The outer groove 49 is an indentation or cut section that is present about the circumference. It may have sharp or chamfered edges. The outer groove 49 is separated from the upper 46 and lower surface 44 of the interface portion 40. The outer groove 49 is shaped so that a ring or O-ring 65 fits around the outer groove 49 and be constrained therein. Therefore, the O-ring 65 cannot move toward the upper 46 or lower surfaces 44 of the interface portion 40. Instead the O-ring 65 remains in the plane of the outer groove 49. In some embodiments, the O-ring 65 may be able to spin or rotate about or in the outer groove 49.

On the side of the body of the interface portion 40, there is a side aperture 48. The side aperture 48 allows access to an internal space 22 of the power means housing 20. In some embodiments, the side aperture 48 may be indented or otherwise have chamfered edges. The chamfered edges are positioned around or circumferential to the side aperture 48.

The indentation of the side aperture 48 allows a finger or a thumb to partially enter the side aperture 48 or such that the opening of the side aperture 48 is below the curved surface of the side of the interface portion 40.

An actuation means 58 is present in the side aperture 48. The actuation means 58 is shaped to fill the side aperture 48 and protrudes slightly on an outer surface of the side aperture 48. The actuation means 58 does not protrude beyond the surface of the interface portion 40. The actuation means 58 is sealingly attached to the to the side aperture 48 such that no materials can pass through the side aperture 48 when the actuation means 58 is present. The sealing means can be in the form of an interference fit, or a seal ring, or can be a resiliently deformable cover that extends over the actuation means 58 and side aperture 48.

To allow actuation of the actuation means 58 to push a button 54 at one end of it (discussed in more detail later) the actuation means 58 may be made from a rubber or other deformable material. This allows it to be adhered to an inner side wall 47 of the side aperture 48, if required, but will still allow the translation of movement through the actuation means 58. Alternatively, the actuation means 58 can be made from a solid material, such as plastic, and can slide within the side aperture 48. A force can be exerted on the actuation means 58 to position it back into an original position after actuation, such as via a spring.

In some embodiments, the actuation means 58 extends beyond the surface of the interface portion 40, or the actuation means 58 may be shaped to have a larger head that is present on an outer surface of the interface portion 40. Such changes could be to allow easier actuation by a gloved hand.

Referring to FIG. 3 and the interface portion 40—as shown in the upper surface 46 of the interface portion 40. This upper surface 46 being generally perpendicular to the cylindrical side walls of the interface portion 40. The upper surface 46 has an access aperture 42 therein. The access aperture 42 defines an opening in the upper surface 46. The opening/access aperture 42 has an edge 43 such that the opening 42 is formed in a centre portion of the upper surface 46. The access aperture 42 allows access to the internal space 22 of the power means housing 20. The access aperture 42 is sized such that access to power connections (described later) can be made through the access aperture 42.

A connection plate 80 is provided inside the interface portion 40. The connection plate 80 is arranged to bisect the axis of the cylinder shape of the interface portion 40 and splits the internal space 22 of the interface portion 40 into two. The connection plate 80 is arranged so that it is above the side aperture 48 in the upper surface 46 direction. The connection plate 80 has cut-outs 82 through which connection cables can be passed, i.e. access for a USB cable is through the access aperture 42 and into the cut-out 82 of the connection plate 80.

In some embodiments, the connection plate 80 has cut-outs 82 or translucent/transparent sections to allow light to be visible from the internal space 22 of the interface portion 40. An LED (or similar) can be present below the connection plate 80 to provide the light.

Figure 4:
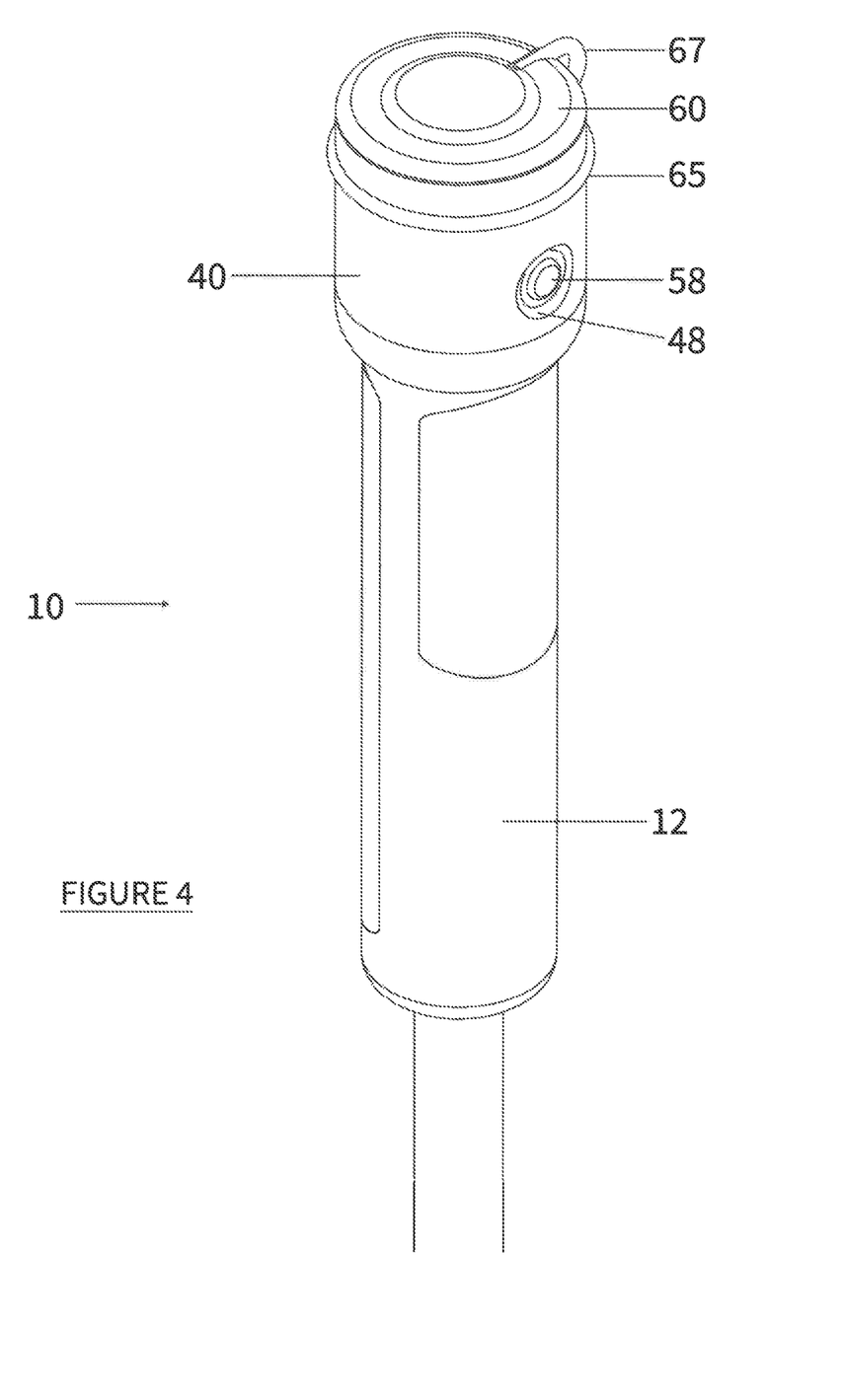
FIG. 4 is an isometric view of the handle in a combined configuration of FIG. 3 with a sealing plug in a closed position.

The access aperture 42 is shaped such that a sealing plug 60 can be placed on and removably connected to it. Namely, the access aperture 42 has a lip or edge 43 where a portion of the sealing plug 60 passes through and around the lip 43 to be restrained in place. The sealing plug 60 has a disk 62 portion. The disk 62 has a similar shape to the upper surface 46 such that the sealing plug 60 covers the whole upper surface 46 when closing the access aperture 42. The sealing plug 60 has a closing portion 64 extending from one side of the disk 62. The closing portion 64 is in the form of a extended portion 66 that is a cylindrical shape and having a radially expanded ridge at an end portion of the extended portion thus forming a recessed groove 68. It is this recessed groove 68 that can be positioned on the lip 43 with the ridge extending into the internal space 22 to seal the sealing plug 60 to the access aperture 42. FIG. 4 shows the sealing plug 60 in the closed position.

The sealing plug 60 can be formed from a rubber type material to allow the deformation to place the closing portion 64, or at least the radial ridge, through the access aperture 42. Alternatively, the disk 62 may be formed of a different material. Other closing means can be used. The closing portion 64 forms a sealed connection with the access aperture 42 to prevent the ingress of materials through the access aperture 42 when the sealing plug 60 is in a closed position. The sealing plug 60 and O-ring 65 are connected by a deformable attachment member 67 to ensure that the sealing plug 60 is tethered to the power means housing 20 when not in a closed position.

Figure 5:
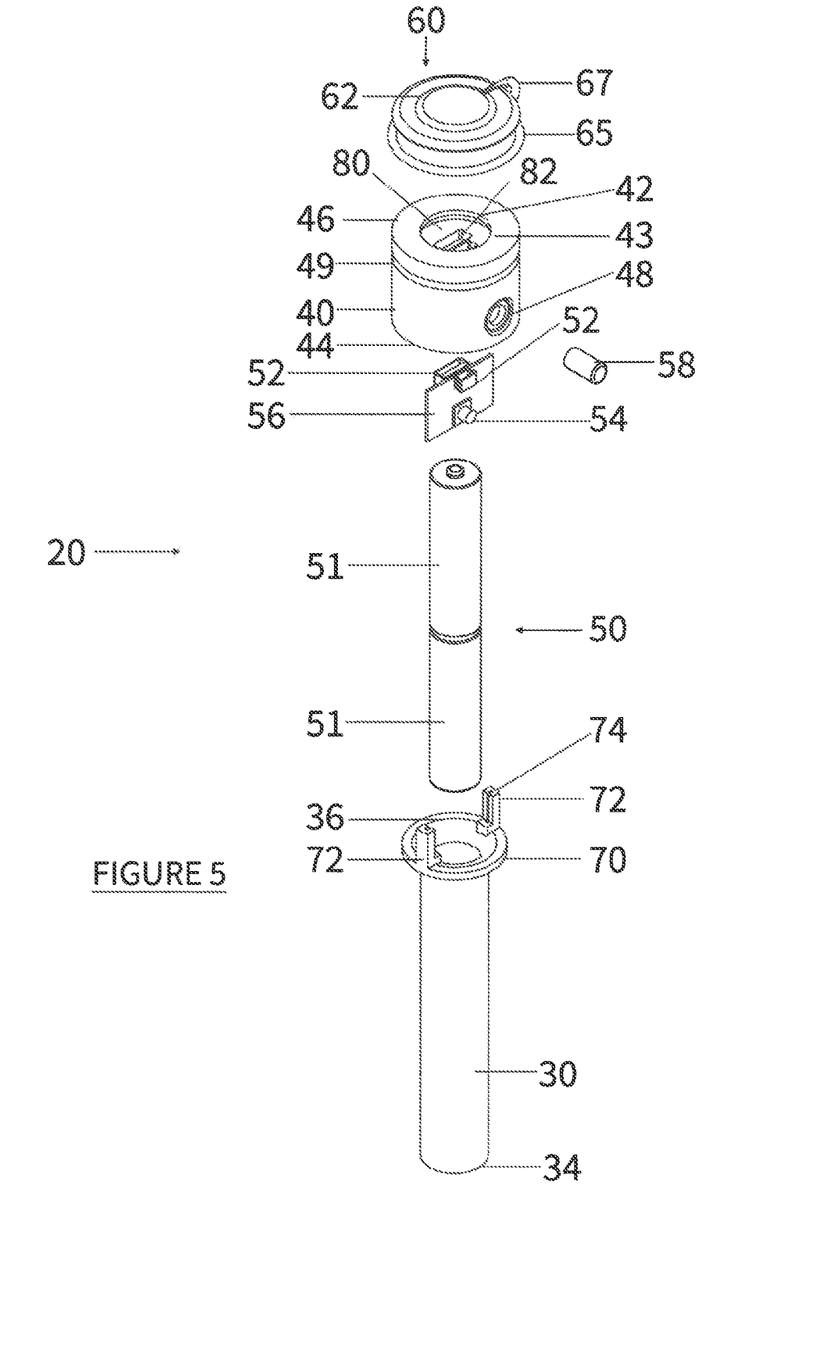
FIG. 5 is an isometric view of the handle of FIG. 4 in an exploded configuration.

Referring to FIG. 5, an expanded or exploded view of the power means housing 20 is shown. Here it can be seen that the interface portion 40 and the elongate portion 30 are separable. The circumference of the second end 36 of the elongate portion 30 is expanded radially compared to the first end 34 of the elongate portion 30. This expanded part is a housing connection means 70 that allows the elongate portion 30 to removably connect to the interface portion 40. In some embodiments, the connection can be through means known in the art, such as clips, fasteners or screw threads.

The elongate portion 30 has a battery aperture 32 at the second end 36 and more specifically in the housing connection means 70 that allows access to the inner section 33 of the elongate portion 30. This tubular inner section 33 houses an electrical power storage means 50. This can include batteries or battery means 51 for providing the power means.

The inner section 33 is shaped so that standard shaped batteries (e.g. AA size) can be housed therein.

Other battery means 51 can be used such as a bespoke shaped rechargeable battery or even a battery that is enclosed and non-removable from the inner section 33.

The housing connection means 70 has two axially extending fingers 72 that extend in a direction away from the first end 34 of the elongate portion 30. These extending fingers 72 are at opposing positions on around the circumference of the housing connection 70. The extending fingers 72 extend into the interface portion 40 when this is positioned in contact with the elongate portion 30. The extending fingers 72 provide the removable connecting means to restrain the interface portion 40 in contact with the elongate portion 30.

The extending fingers 72 are L-shaped with the shorter part of the finger sat in a radial direction on the upper surface of the housing connection 70. The longer part of the extending fingers is formed flush with the outer circumference of the housing connection 70.

The extending fingers 72 each have holding grooves 74 extending in an axial direction (with reference to the elongate portion 30). The holding grooves 74 for each finger 72 face one another and extend partially through the holding grooves 74 in an outward radial direction.

Referring to FIGS. 5 and 6, these show the power board 56, FIG. 5 showing a dissembled form and FIG. 6 showing the assembled form. The power board 56 is formed as a board that has the power connections to enable electricity from the electrical power storage means 50 means to be accessible to power ports 52 positioned on the power board 56. The power board 56 can be a circuit board. The power board 56 is removably positioned between the holding grooves 74 of the housing connection 70. The board of the power board 56 slides within the holding grooves 74 and is restrained against the shorter part of the L shaped extending fingers 72 on a top surface of the housing connection 70 (i.e. the second end 36). In this position, the power board 56 is in contact with the electrical power storage means 50. The power board 56 is contained within the interface portion 40 when the interface portion 40 is connected to the elongate portion 30. The power board 56 is removable by sliding the board out of the holding grooves 74 in a direction opposite to the first end 34 of the elongate portion 30.

The power board 56 has a power button 54 on a surface. When the power board 56 is positioned on the housing connection 70, and the interface portion 40 thereon, the power button 54 is aligned with the side aperture 42. Depressing of the actuation means 58 through the side aperture 42 actuates the button 54 on the power board 56.

The power button 54 may have a number of functions, such as turning the flow of electricity from the electrical power storage means 50 on or off, indicating the battery level or switching between outputs. The power button 54 or a housing therearound may be an LED or light emitting means to indicate a status, such as "ON", or indicate a level of a battery. The actuating means 58 may be translucent or transparent to allow light from the power button 54 to be visible through it.

The top of the power board 56 positioned away from the housing connection 70 has the power ports 52 affixed. These are positioned such that when the power board 56 is positioned on the housing connection 70, the power ports 52 align with the cut-outs 82 in the connection plate 80 in the interface portion 40.

This arrangement allows access to a power port 52 when the sealing plug 60 is removed and therefore electricity can be supplied from the electrical power storage means 50 to a device plugged into the power ports 52. Actuation of the power button 54 can then control the power. The power ports 52 can be USB ports of various types, or any other connector suitable for delivering power (or data) to a device. There may be a single power port 52, or multiple power ports 52 may be provided.

Figure 7:
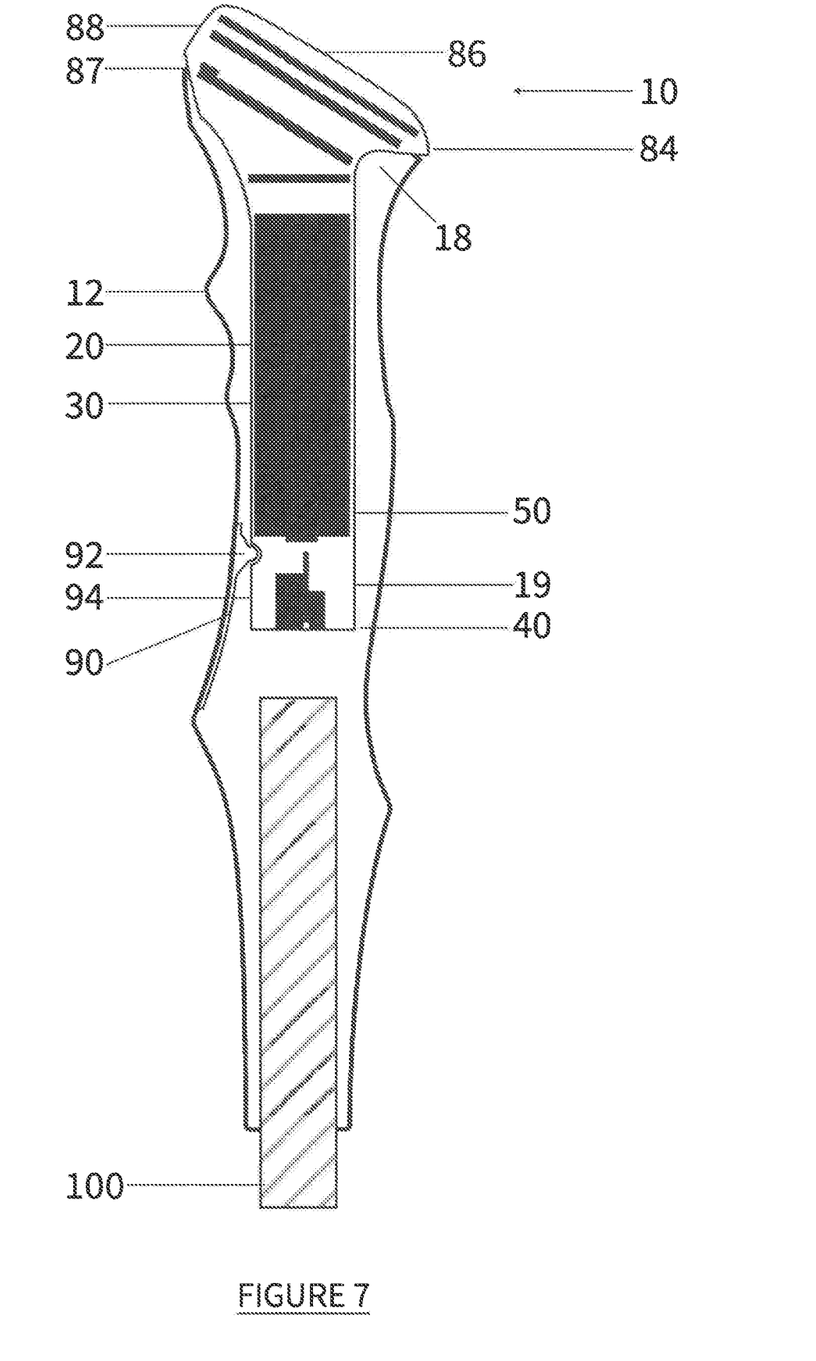
FIG. 7 is a side sectional view of an embodiment of the invention.

FIG. 7 shows a handle 10 according to an embodiment of the present invention that can include features as described above. Like features have the same reference numbers as other embodiments. A handle 10 is shown that includes a handle body 12 forming the grip of a handle 10 for a pole 100. Ski poles, walking poles and gold sticks are envisaged. However, an inverted pole, such as in an umbrella could likewise include such a handle body 12.

The handle body 12 extends around a pole 100 at the base of the handle body 12. The handle body 12 is ergonomically shaped to allow a grip suitable for the type of pole 100. For instance, for a ski pole, the grip will be larger to accommodate the wearing of gloves and can have a wrist strap.

The handle body 12 has an open portion 18 at the top end positioned away from the pole end of the handle 10. This open portion 18 is in the form of an enclosure aperture 18 that provides access to an internal cavity 19 within the handle body 12. The cavity 19 differs to that which holds the pole 100. The internal cavity 19 is elongate and has only the enclosure aperture 18 opening. The mouth of the internal cavity 19 widens from a parallel cylinder into the enclosure aperture 18.

Within the internal cavity 19 is a battery housing 20. The battery housing 20 is shaped such that an elongate member portion 30 fills the elongate part of the cavity 19. The battery housing 20 likewise has a head portion 84 that widens to occupy the same shape of the widening of the cavity 19 to occupy the enclosure aperture 18. This head portion 84 of the battery housing 20 then further extends so that it protrudes from the internal cavity 19 and enclosure aperture 18 such that it sits proud. The head portion 84 also extends wider than the enclosure aperture 18 such that it sits on the enclosure aperture 18. The head portion 84 has a relatively flat top surface 86, with only a minor curvature. This allows a display 88 to be positioned within the head portion 84 and therefore space is provided for the display 88 within head portion 84 and a flatter surface ensures that the display 88 can be seen through the head portion 84.

Figure 8:
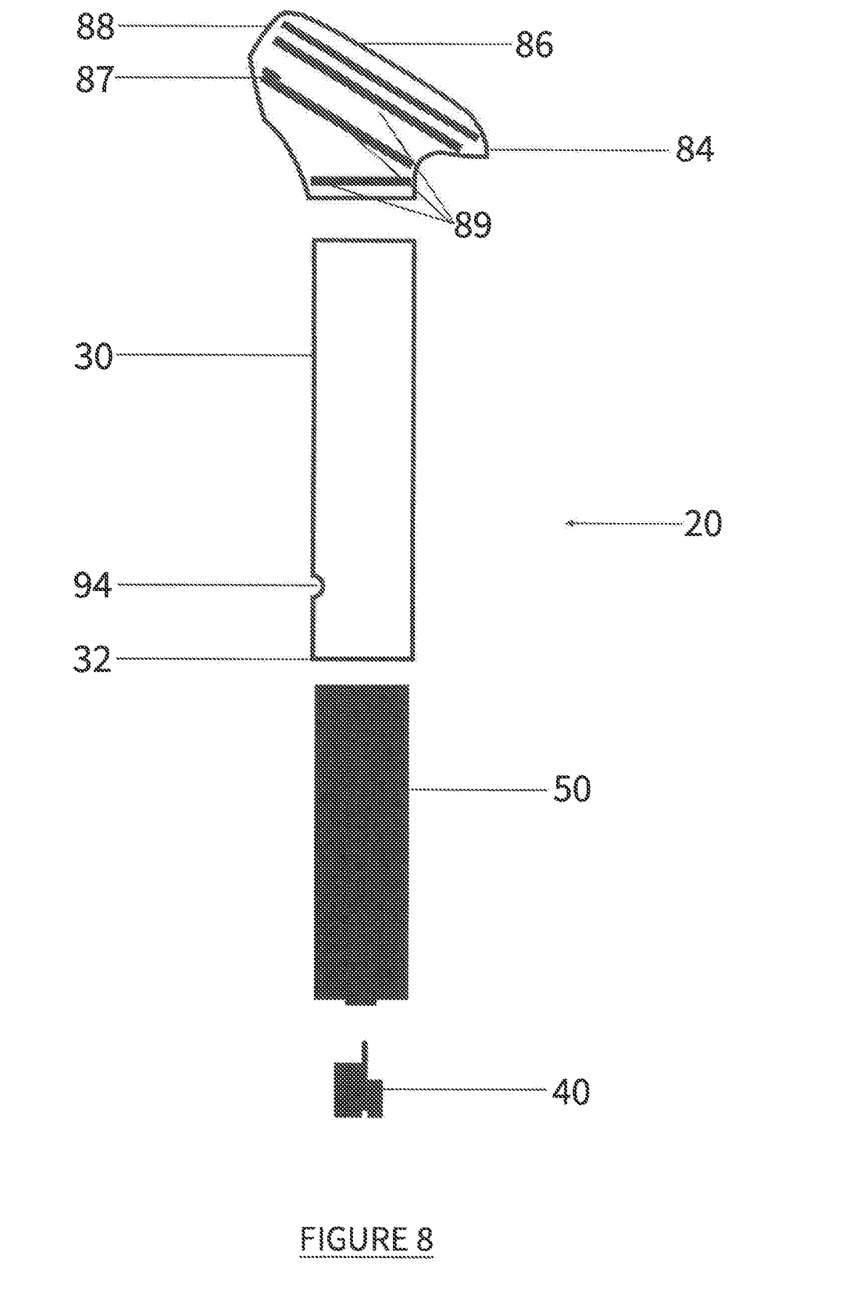
FIG. 8 is a side view schematic of an exploded view of the battery housing.

The head portion 84 and elongate portion 30 can be formed as a single part. Alternatively, as shown in FIG. 8, the head portion 84 and elongate portion 30 can be two parts that are either detachably joined or permanently sealed together.

The battery housing 20 contains an electrical power storage means 50, (e.g. a battery), an interface portion 40 (e.g. USB ports), a display 88 and various electrical components that includes controllers such as printed circuit boards 89 and processors, a communication means for data connectivity, such as a Bluetooth connection or a WiFi connection. Other electrical components can also be included such as a GPS receiver, a cellular connection, etc. The interface portion 40 includes the power board 56 as described in other embodiments.

These components combine to form so-called Smart Tech. Therefore, the display 88 can show various details such as a direction of travel or directions to reach a particular location. This can be in the form of an arrow on the display. The display 88 can use GPS built into the handle 10. Alternatively, information can be provided from a smart device (such as a mobile phone) in communication with the device via the communication means. The display 88 and preference can be altered via the connected device through an app or similar interface. An interface means 40, such as a button or touch display, can also be provided on the handle 10.

A light means 87, such as an LED is contained in the head portion 84 of the battery housing 20. This can be seen through a window 86 in the head portion 84 of the device that sits above the handle body 12 when the battery housing 20 is in the handle body 12. The LED means 87 can have multiple uses such as indicating a low battery, indicating whether the battery housing 20 is properly mounted in the handle body 12 or indicating a notification from a paired mobile device. The indications can be in the form of flashing or the light emitting in different colours.

A number of PCBs 89 are shown in the battery housing 20 for controlling the various features. The actual number and position of these will vary depending on the functions required.

The handle body 12 has a depressable button 90 on its outer side. The button 90 is positioned on the bottom half of the moulded grip. This can be lower than a hand would normally grip, or at least where only the last digit or two of a hand would grip. This ensures that the button 90 is not accidentally depressed when the pole handle 10 is in use. The button 90 passes through the handle body 12 and interfaces with the battery housing 20. The interface is a protrusion 92 extending from the button 90. The battery housing 12 has a corresponding notch 94. The notch 94 is positioned on the outer surface of the battery housing 12 on the side of the elongate member 30. This prevents vertical movement of the battery housing 12 when the notch 94 and protrusion 92 are engaged.

The button 90 can be in the form of a lever 90 such that when part of the lever 90 is depressed, the protrusion 94 is moved away from the battery housing 12. This allows the release of the battery housing 12 so it can be removed from the handle body 10. The lever 90 is biased so that it is normally in the depressed or closed state whereby the battery housing 12 is held in the handle body 10.

The lever 90 can be pivotably connected to the handle body 10 such that it rotates from on position to another position.

Other means for holding the battery housing 12 in the handle body 10 could be used, such as catches that slide or pins that retract.

The interface portion 40 is provided at the end of the elongate member 30. This is also shown in FIG. 8. The interface portion 40 allows the connection to the electrical storage means 50 from the outer part of the battery housing 20. The interface portion 40 can be a USB port or other kind of port and is in contact with the electrical storage means 50 housed within the elongate member 30. The interface portion 40 has a plug to seal the interface portion 40 inside the battery housing 12. The plug can either have the ports accessible through it through suitably sized port holes, or it can be a solid plug that it must be removed before access to the ports is provided to provide a seal to the ports. The plug can be referred to as an access aperture.

The battery 50 is insertable into the elongate member 30 of the battery housing 12 through the bottom at a battery aperture 96, i.e. the part that sits in the bottom of the internal cavity housing 19. This can be the same aperture 96 through which the interface portion 40 is provided. Therefore, the interface portion 40 can form the plug for sealing the battery housing 12.

In other embodiments, access to a port of the interface portion 40 can be through the handle body 12 or at the head portion 84 of the battery housing to allow access to the ports and thus electrical power whilst the handle 10 is in use. Access for inserting the battery 50 can also be at the other end, for instance, the head portion 84 and elongate portion 30 can be split to allow a battery 50 to be inserted. Alternatively an aperture can be provided in the head portion 84.

A dummy handle can be provided that is identical in appearance to the handle 10. However, none of the internals are provided. Instead, it is weighted such that it feels the same weight as the handle 10 but lacks any power storage means or smart functionality.

The handle and its components can be made from plastic, or a combination of plastic and rubberised material to improve grip and provide a more comfortable hand grip. The electrical components, such as the ports and power board, can be manufactured from components that conduct electricity, such as metals, and have insulating materials where required, such as plastics. The elongate member can by formed from metal, such as aluminium. The head portion can be formed from plastics and/or polymers.

Preferred features of the present invention have been described above purely by way of example. Modifications in detail may be made to the invention within the scope of the claims appended hereto.

The invention claimed is:

1. A handle for a pole, wherein the handle comprises:
a handle body having an internal cavity;
a battery housing, wherein at least part of the battery housing is located within the internal cavity through an enclosure aperture;
an interface portion positioned at an end of the battery housing;
a communication means for transferring data wirelessly between a mobile computing device;
a display means positioned on the battery housing and configured to display information provided through the communication means;
wherein the battery housing has an electrical power storage means therein and wherein an electronic device is connectable to the electrical power storage means through the interface portion for transferring electrical power between the electrical power storage means and a connected electronic device.

2. The handle according to claim 1, wherein the battery housing comprises a head portion and an elongate portion, and wherein the enclosure aperture is sealed by the head portion of the battery housing.

3. The handle according to claim 2, wherein at least part of the head portion is wider than the enclosure aperture to sealingly close the enclosure aperture.

4. The handle according to claim 2, wherein the head portion is detachable from the elongate portion.

5. The handle according to claim 2, wherein the elongate portion has a first end and a second end and the interface portion has a first surface and a second surface and being removably connected at its lower surface to the second end of the elongate portion.

6. The handle according to claim 5, wherein there is provided a side aperture in the interface portion positioned on an outer wall between the first surface and the second surface, the side aperture providing access to a power button for operating the supply of electrical energy from the electrical power means.

7. The handle according to claim 6, wherein the power button comprises an LED, wherein the LED is operable to indicate at least one of the status of the operating the supply or the status of the electrical energy level.

8. The handle according claim 6, wherein the power button and a power port are provided on a power board, the power board configured to provide a connection from the electrical power storage means to the power button and power port.

9. The handle according to claim 8, wherein the power board provides the transfer of electrical energy connection between the electrical power storage means and the power port and the power board enables the control the transfer of electric energy by the power button.

10. The handle according to claim 1, wherein the head portion protrudes from the external cavity.

11. The handle according to claim 1, wherein the interface portion is contained within the battery housing and accessible through an access aperture in the battery housing.

12. The handle according to claim 11, comprising a power port within the access aperture connected to the electrical power storage means, the power port being configured for connection of a device for the supply of electrical energy from the electrical power storage means to the device and/or the supply of electrical energy from a device to the electrical power storage means.

13. The handle according to claim 12, wherein multiple power ports are provided within the aperture where each port is configured to supply electrical energy from a device, supply electrical energy to a device, or both.

14. The handle according to claim 1, wherein the battery housing comprises a battery aperture to allow the insertion of the electrical power storage means.

15. The handle according to claim 14, wherein the battery aperture is located at the same end of the battery housing as the interface portion.

16. The handle according to claim 1, wherein at least part of the battery housing is removably located within the internal cavity.

17. The handle according to claim 1, wherein a release mechanism is provided on the handle body for allowing the battery housing to be released from the location in the handle body, and wherein the release mechanism comprises a lever connected to the handle body and moveable from a first position to a second position, wherein in the first position a portion of the lever is in contact with the battery housing constraining movement of the battery housing and in the second position the lever is positioned away from the battery housing.

18. The handle according to claim 17, wherein the release mechanism constrains the battery housing by a protrusion and notch arrangement on the battery housing and release mechanism.

19. The handle according to claim 1, wherein the interface portion is sealingly closed by the internal cavity.

20. The handle according to claim 1, wherein the handle body comprises connecting means to allow connection of the handle to a pole at the end of the handle body opposing the enclosure aperture.

* * * * *